United States Patent
Einfalt et al.

(10) Patent No.: US 10,303,142 B2
(45) Date of Patent: *May 28, 2019

(54) NETWORK REGULATION UPON THRESHOLD VALUE OVERSHOOTS IN A LOW VOLTAGE OR MEDIUM VOLTAGE NETWORK

(71) Applicant: Siemens Aktiengesellschaft, Munich (DE)

(72) Inventors: Alfred Einfalt, Vienna (AT); Tobias Gawron-Deutsch, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 243 days.

This patent is subject to a terminal disclaimer.

(21) Appl. No.: 15/182,237

(22) Filed: Jun. 14, 2016

(65) Prior Publication Data
US 2016/0363918 A1    Dec. 15, 2016

(30) Foreign Application Priority Data
Jun. 15, 2015    (DE) .................. 10 2015 210 884

(51) Int. Cl.
*G05B 19/042*    (2006.01)
*H02J 3/32*    (2006.01)
(Continued)

(52) U.S. Cl.
CPC .............. *G05B 19/042* (2013.01); *H02J 3/12* (2013.01); *H02J 3/32* (2013.01); *H02J 3/382* (2013.01);
(Continued)

(58) Field of Classification Search
CPC . G05B 19/042; G05B 2219/2639; H02J 3/12; H02J 3/32; H02J 3/382;
(Continued)

(56) References Cited

U.S. PATENT DOCUMENTS

| | | | | |
|---|---|---|---|---|
| 2009/0055030 A1* | 2/2009 | Mayor | ................. | F03D 7/0284 700/287 |
| 2009/0240449 A1* | 9/2009 | Gibala | ................. | G01R 22/063 702/62 |

(Continued)

FOREIGN PATENT DOCUMENTS

| | | | | |
|---|---|---|---|---|
| DE | 10 2005 056 084 | | 6/2007 | |
| EP | 2020506 A2 * | | 2/2009 | ............. F03D 7/028 |

(Continued)

OTHER PUBLICATIONS

Gawron-Deutsch T. et al., "Integration von Energiemarkt und Verteilnezbetrieb durch einen Flexibility Operator", In Elektrotechnik & Informationstechnik; 131 Jahrgang, Heft 3; pp. 91-98, DOI: 10.1007/s00502-014-0200-6 (2014).

(Continued)

*Primary Examiner* — Darrin D Dunn
*Assistant Examiner* — Jigneshkumar C Patel
(74) *Attorney, Agent, or Firm* — Cozen O'Connor

(57) ABSTRACT

A method for network regulation upon threshold value overshoots in a low voltage or medium voltage network, wherein control commands are transmitted from a central regulation unit of the low or medium voltage network to controllable components of the low voltage or medium voltage network, where upon occurrence of the threshold value overshoot, the central regulation unit calculates the necessary correction and transmits a suitable action instruction to at least one controllable component, with each action instruction, a probability factor is also transmitted which is incrementally raised if, given an insufficient reaction of the controllable components, the threshold value overshoot is not prevented and thus an action instruction must be transmitted anew, and the central regulation unit informs the network operator if the emergency reserves of the control- (Continued)

lable components are insufficient to prevent the threshold value overshoot.

16 Claims, 3 Drawing Sheets

(51) Int. Cl.
   *H02J 3/38* (2006.01)
   *H02J 3/12* (2006.01)
   *H02J 3/00* (2006.01)
   *H02J 13/00* (2006.01)

(52) U.S. Cl.
   CPC ... *G05B 2219/2639* (2013.01); *H02J 13/0079* (2013.01); *H02J 2003/001* (2013.01); *Y02E 40/72* (2013.01); *Y02E 60/722* (2013.01); *Y02E 70/30* (2013.01); *Y04S 10/123* (2013.01); *Y04S 10/14* (2013.01); *Y04S 10/525* (2013.01)

(58) Field of Classification Search
   CPC . H02J 13/0079; H02J 2003/001; Y02E 40/72; Y02E 60/722; Y02E 70/30; Y04S 10/123; Y04S 10/14; Y04S 15/525
   USPC .......................................................... 700/295
   See application file for complete search history.

(56) References Cited

U.S. PATENT DOCUMENTS

| 2014/0176336 | A1* | 6/2014 | Li | G01R 31/025 340/870.01 |
|---|---|---|---|---|
| 2015/0094871 | A1* | 4/2015 | Bhageria | H02J 3/00 700/297 |
| 2016/0064970 | A1* | 3/2016 | Shimizu | H02J 3/386 320/134 |
| 2016/0124411 | A1* | 5/2016 | Tinnakornsrisuphap | G05B 19/0428 700/291 |

FOREIGN PATENT DOCUMENTS

| EP | 2 763 264 | 8/2014 |
|---|---|---|
| WO | WO 2014/090285 | 6/2014 |

OTHER PUBLICATIONS

Search Report dated Oct. 19, 2016 which issued in the corresponding European Patent Application No. 16162202.2.

* cited by examiner

NETWORK REGULATION UPON THRESHOLD VALUE OVERSHOOTS IN A LOW VOLTAGE OR MEDIUM VOLTAGE NETWORK

BACKGROUND OF THE INVENTION

1. Field of the Invention

The invention relates to a method for network regulation upon threshold value overshoots in a low voltage or medium voltage network, where control commands are transmitted from a central regulation unit of the low voltage or medium voltage network to controllable components of the low voltage or medium voltage network. The invention can be used respectively for just a low voltage network or just a medium voltage network.

2. Description of the Related Art

Low voltage networks are part of the power network for distribution of the electrical energy to the majority of the electrical consumers, which consists of low voltage devices. In order to prevent voltage losses, low voltage networks are restricted in their spatial extent to a region from a few 100 m to a few kilometers. They are therefore fed regionally via transformer stations from a higher-order medium voltage network. In Europe, they are typically operated at a network voltage of 230 V (between each phase conductor and the neutral conductor) or 400 V (between the three phase conductors), and in any event only up to 1000 V. The rated power output of individual distribution transformers can vary according to the target system planning of the respective distribution network operator, but typically lie in the range of 250 or 400 kVA for rural areas and 630 or 800 kVA for inner city areas.

The expression "low voltage network" in the sense of this invention refers to a part of the distributor network, i.e., a portion that is supplied with electrical energy by a particular distribution transformer.

Components of the low voltage network can be: electrical generators (e.g., photovoltaic systems, or small wind generator systems), storage units (e.g., batteries, heat pumps, or charging stations for electric vehicles), flexible consumers (e.g., electric storage heaters, or buildings with and without building automation system) and network operating equipment (transformers, transmission lines, fuses, measuring devices such as smart meters, etc.).

Herein, particularly electrical generators, storage units and flexible consumers can be configured as controllable components.

Medium voltage networks are part of the power network for distributing the electrical energy over distances in the range of a few kilometers to 100 km in rural areas. They are typically operated at a maximum voltage of between 1 kV and 52 kV, in particular at 10 kV, 20 kV or 30 kV. A medium voltage network typically serves for electrical energy supply to a region that comprises a plurality of villages or, in cities, an urban district. Medium voltage networks of the regional distribution network operators are typically fed in transformer substations from the higher-level high voltage network, such as the 110 kV level (distribution network level), and serve to feed the regionally distributed transformer stations that supply the individual low voltage networks to the end customers. Larger power consumers such as industrial plants and hospitals, but also large swimming baths and major transmitting towers, usually have their own medium voltage connections with their own substations.

The power transformers needed for the supply lie in the range from 20 MVA to 60 MVA. Typically, these power transformers are also the last level at which load-dependent voltage variations can be compensated for via stepping switches. If needed, for large feed power levels from decentrally obtained regenerative energy sources, electronic medium voltage regulators can be used.

Medium voltage networks are implemented in their topology as radial systems or as ring systems and, particularly in urban regions, ring feeders are common. Medium voltage networks can be fed from a plurality of points and smaller generating plants such as wind generator systems, biogas systems and large photovoltaic systems feed into regional medium voltage networks.

In a medium voltage network, in particular, power transformers, medium voltage regulators, electrical generators, storage units and flexible consumers can be configured as controllable components.

The classic power supply operation for electrical supply is facing great challenges due to the increasing establishment of decentralized, mostly renewable, energy generating plants (DEA, typically in the power range from 3 to 100 kW). Added to this is the development of electric vehicles and therefore an increased substitution of other energy transmission forms by electricity. Due to the change of the energy system from one based on conventional energy sources to one based on renewable energy sources, the need for flexibility is growing. This arises from the fact that many renewable energy sources (wind, solar, water) are available only depending on the situation and not according to predetermined timetables. Thus, the former principle of "generation following consumption", has to undergo a fundamental change to "consumption following generation".

"Flexibility providers" are tools for adapting use to generation. A flexibility provider is to be regarded as a large group of different uses. In the simplest case, this can be flexible loads, such as heat pumps, charging points for electric vehicles, circulating pumps, electric heating systems, or electric boilers that are reduced or switched off. On the generating side, the feed-in of renewable or conventional generating plants (wind power plants, photovoltaic plants, power/heat coupling systems) could be reduced. If an electrical storage unit is also available, possibly even in combination with flexible loads or generating plants, flexibility is possible in all power directions.

The core question of the energy revolution seen on an industrial scale is how the individual network participants (only or additionally) consuming energy, for example, buildings or groups of buildings, can participate with as little influence on them as possible in different energy markets in order to develop, for example, the city as a source of flexibility to support the integration of renewable energy sources. Herein, it must be ensured that the permissible limit values (voltage, maximum power, frequency) in the energy supply network, such as in the low voltage network, are not breached.

Network bottlenecks can arise because the participation in energy markets and the use of internal storage units (which are not recognizable from the network viewpoint because they are located, for example, within buildings or industrial sites) can alter the previous temporal distribution of the load (e.g., according to the standard load profile HO). Many prosumers (customers who produce and consume energy) receive the same information concerning inexpensive energy and change their usage behavior accordingly. The conventional assumptions regarding simultaneity are no longer valid and severe load spikes can arise. If these load spikes breach the limit values of the energy supply network, intervention is necessary.

The "smart grid" is regarded as a solution to these problems. The smart grid or intelligent power network comprises the communicative networking and control of electrical generators, storage units, electrical consumers and network operating equipment in energy transmission and energy distribution networks of the electricity supply system.

In the future, "smart buildings", also known as intelligent houses or intelligent buildings will also contain components such as fluctuating generators (e.g., photovoltaic systems, or small wind generator systems), flexible consumers and storage units for electrical energy, or, for example, the charging infrastructure for electric vehicles. The building is made "smart" or intelligent by the use of a modern building automation system (CEMS—consumer energy management system). Building automation comprises the totality of monitoring, control, regulation and optimization equipment in buildings. It is an aim to perform functional sequences across all components independently (automatically) and in accordance with pre-determined setting values (parameters). All sensors, actuators, operating elements, consumers and other technical units in the building are networked together. Sequences can be grouped together in scenarios. A characterizing feature is the networking throughout via a bus system.

The building automation systems of smart buildings and/or the energy management systems as part of the building automation systems must therefore optimize the energy requirement for electrical and thermal energy for the individual components of the building, create local (related to the building) prognoses and take account of flexible tariff information that contains market and/or network-specific portions.

A low voltage network comprises different active components that cooperate in the low voltage network. There is a plurality of types of consumers, generators and mixed forms. The connected buildings can have no remotely readable meters, be equipped with "smart meters" or can be equipped with a building management system. In addition, there is the distribution network operator who operates a, where possible regulable, distribution transformer (RONT) and thus operates the existing low voltage network. Together, all these components form the local branch circuit in which the network constraints must be adhered to.

None of the components mentioned above can remedy any network problems without throttling. Conventionally, for example, inverters were equipped with a P/Q infeed limitation (e.g., voltage-dependent effective power characteristic curves and reactive power characteristic curves) which prevents too much power from being fed into the low voltage network in the event of a local threshold value overshoot. Thus, although adherence to the network constraints is ensured locally, it not certain that either the throttling of these components is sufficient, or that throttling is not too severe and that thereby less energy than possible is obtained.

An attempt to disentangle the market overview and the network overview is the "network traffic lights". The states red, amber and green reflect the respective network states. The individual components, particularly the generators, can only operate in the green state where, from the local network viewpoint, no limitations exist and all the market mechanisms (e.g., making system services available for transmission networks) can be used without restriction or, in the red state, where the network constraints require strict stipulations for feed-in and thus market mechanisms are locally restricted for a limited time. In the amber state, overloading is to be expected and, within the network constraints, a market-based optimization of the capacity utilization of the low voltage network can be undertaken, i.e., an optimization of the energy supplied by the individual components (e.g., the generators in the low voltage network) or to energy supplied to the individual market participants with regard to the prevailing applicable energy price. Herein, more or less complex mechanisms which are aimed at enabling as many market requirements as possible without severe restriction are considered.

In the red region, the distribution network operator (network operator for short) is enabled to protect his distribution network. Herein, in the first place, classic network regulation operates, e.g., the control of the regulable network transformers. If the network operator cannot protect his network without the assistance of controllable components of the low voltage network, e.g., smart buildings, there must be a "priority signal" that is compulsory and to which the reaction is instantaneous.

A possibility for implementing the priority signal is the known audio-frequency ripple control system, TRA. With this, loads, such as storage heaters, are controlled by a control center. Herein, however, there are technical problems, by reason of which the TRA is increasingly relieved by other devices by network operators. Smart meters represent, in part, the successors that can either themselves, or via an additional gateway, switch individual components. It is therefore already technically possible to transmit a unidirectional ON/OFF command. If a plurality of components receive such a command simultaneously, through the simultaneous switching of the collective loads, problems can arise that can be lessened by a grouping of loads (e.g., per substation) and a temporally offset transmission of the switch-off commands, which occurs centrally from the control center.

However, these methods of unidirectional transmission of control commands for use as a priority signal are too global and too coarse for the targeted protection of selected low voltage networks.

SUMMARY OF THE INVENTION

It is therefore an object of the present invention to provide a method for network regulation upon threshold value overshoots in a low voltage or medium voltage network, where control commands are transmitted from a central regulation unit of the low voltage or medium voltage network to controllable components of the low voltage or medium voltage network, to generate a priority signal that is better adapted to the respective low voltage or medium voltage network.

This and other objects and advantages are achieved in accordance with the invention by a method in which, upon the occurrence of a threshold value overshoot, the central regulation unit calculates the necessary correction and transmits a suitable action instruction for reducing threshold value overshoots to at least one controllable component, with each action instruction, a probability factor is also transmitted that is incrementally raised if, given an insufficient reaction of the controllable components, the threshold value overshoot is not prevented and thus an action instruction must be transmitted anew, and the central regulation unit informs the network operator, if the emergency reserves of the controllable components are not sufficient to prevent the threshold value overshoot.

Following a threshold value overshoot, a calculation is completed to determine which correction should be performed by the controllable components. An action instruction is then generated as a priority signal, for example, to reduce or increase the effective power by a particular value and a probability factor in the range between 0 and 1. If the action instruction is not or is insufficiently followed, this probability factor is incremented by a particular value and the action instruction is re-transmitted with this new probability factor to the participating controllable components. This procedure is repeated until the threshold value overshoot is remedied.

If the controllable components addressed by the central regulation unit do not have sufficient emergency reserves available to reduce the threshold value overshoot adequately, then this is notified to the network operator so that he can institute suitable measures.

Fundamentally, two different embodiments of method are conceivable. The first consists therein that the same action instruction is transmitted with the same probability factor to a plurality of, in particular all, controllable components that can receive such action instructions. Thus, a single signal is emitted by the central regulation unit and all the controllable components which can receive the signal should obey the action instructions contained in the signal. This has the disadvantage that the efforts to remedy the limit value breach are possibly not equitably distributed to the controllable components.

Herein the second embodiment can provide redress in that different action instructions are transmitted for different controllable components, but with the same probability factor. Thus, a larger contribution for network stabilization (e.g., more kW of power increase or decrease) could be demanded from one component than from another component.

This approach can be further improved in that the selection of the controllable components that are to make a contribution from their emergency reserves is performed based on topological information about the low voltage or medium voltage network. Thus, the absolute position (e.g., connected to which conductor strand) of the controllable components and/or the relative position (e.g., the sequence of the controllable components on a conductor strand) in the low voltage or medium voltage network is known. It can thus be ensured that only those components are addressed that can actually contribute to a resolution of the threshold value overshoot due to their position in the low voltage or medium voltage network.

In order that, upon selection of particular controllable components for a contribution to reducing the threshold value overshoot, a single component is not loaded excessively, it can be provided that a minimum number of controllable components is always selected.

In a further embodiment of the invention—for selection from a minimal number of alternatives—or for both embodiment, each controllable component specifies for itself, according to the random process, a selection factor that is added to the probability factor and on each further threshold value overshoot in the low voltage or medium voltage network is specified anew. Like the probability factor, the selection factor lies between 0 and 1. With this, for all the controllable components affected by a particular action instruction, a different resulting probability factor arises, where the requirement to take action for the individual component is compulsory on reaching the value 1. The selection factor remains the same for the existing threshold value overshoot, even if the action instruction must be transmitted multiple times with increasing probability factor. Only on the next threshold value overshoot does a different selection factor typically arise for the relevant component according to the random process and thus a different resulting probability factor than with other components. In this way, it can be ensured that not always the same components are called upon to remedy threshold value overshoots.

The action instruction typically contains one of the following control commands: reduce the effective power by a specified amount, increase the effective power by a specified amount, set a specified inductive reactive power, or set a specified capacitive reactive power.

It is also an object of the invention to provide a system for performing the method in accordance with the invention, comprising a central regulation unit and a plurality of controllable components of a low voltage or medium voltage network which are connected to one another via a communication network.

In accordance with the invention, a plurality of controllable components have a transmitting device in order to each continuously transmit information continuously via the communication network to the central regulation unit regarding their own emergency reserves for reducing threshold value overshoots.

Moreover, the central regulation unit is configured to calculate, upon the occurrence of a threshold value overshoot, the necessary correction and transmit a suitable action instruction for reducing threshold value overshoots to at least one controllable component that transmits information regarding emergency reserves, the central regulation unit is further configured in order, with each action instruction, to also transmit a probability factor that is incrementally raised if, given an insufficient reaction of the controllable components, the threshold value overshoot is not prevented and thus an action instruction must be transmitted anew, and the central regulation unit is further configured to inform the network operator, if the emergency reserves of the controllable components are not sufficient to prevent the threshold value overshoot.

The controllable components can be buildings with building automation systems, where the receiving device is a component part of the respective building automation system. A receiving device of this type for receiving the action instructions or priority signals should be present as a rule not only in building automation systems but in all controllable components in any case.

The communication network can comprise a carrier frequency system that is also designated Power Line Communication (PLC) and where the transmission of the signals via the power network occurs, thus here via the conductor strands of the low power or medium power network.

However, the communication network can also comprise remotely readable counters, so-called "smart meters" so that the action instructions in accordance with the invention are transmitted via the data connections of the smart meter.

The method in accordance with the invention is typically implemented as a computer program, so that the invention also relates to a computer program product which comprises a program and can be loaded directly into a memory store of a central regulation unit of a low voltage or medium voltage network, and has program instructions or code for performing all the steps of the method in accordance with the invention when the program is executed by the central regulation unit.

The conventional methods are therefore replaced with a method in accordance with the invention to ensure the network integration of flexibility providers that operate freely on markets, where the action instructions used as unidirectional non-discriminating priority signals can be used more precisely and more comprehensibly for problem rectification. In this way, controllable components can be called upon fairly to ensure network quality.

Controllable components cooperating in the method in accordance with the invention, in particular, smart buildings can be specifically addressed, for example, via their building automation systems (CEMS) and they can be set tasks in a targeted manner. These stipulations must be implemented immediately without regard to loss of convenience. With the evaluation system, it can be ensured with the aid of the selection factors that the priority signals do not always affect the same controllable components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For the further explanation of the invention, in the following part of the description, reference is made to the drawings, in which further advantageous embodiments, details and developments of the invention are disclosed, in which.

DETAILED DESCRIPTION OF THE EXEMPLARY EMBODIMENTS

Figure 1:
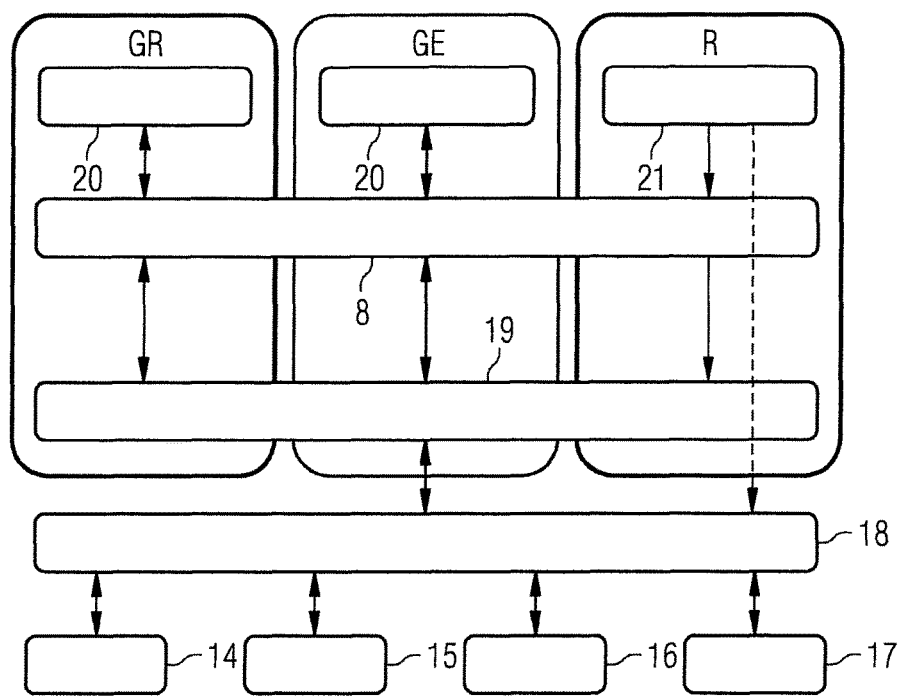
FIG. 1 is a flow diagram of the method in accordance with the invention in conjunction with the different network states according to the "network traffic lights"

The method in accordance with the invention can be embedded in the traffic lights model, which was developed as a basis for discussion within the National Technology Platform Smart Grids Austria (see FIG. 1) as follows. The states red R, amber GE and green GR each relate to the different network state. The same applies for all local components.

Here, the individual controllable components of the low voltage network are subdivided into energy generators 14, electric vehicles or the charging stations 15 therefor, energy stores 16 and flexible consumers 17. They are all controlled or regulated via control and regulation units 18 which are monitored via a higher-order control system 19 (e.g., a building management system of a building).

In the amber or green state, market-based energy services 20, such as market mechanisms, can act upon the higher-order control system 19. In the green state, information on the energy price and/or the energy quantity can be exchanged and the control system 19 and/or the control and adjustment units 18 can accordingly transmit other control commands to the controllable components. In the amber state, information on the energy price and/or the electrical power can be exchanged and the control system 19 and/or the control and adjustment units 18 can accordingly transmit other control commands to the controllable components.

In accordance with the invention, the central regulation unit 8 is now connected between the market-based energy services 20 on one side and the control system 19 or the control and adjustment units 18 on the other side, where the central regulation unit is designated Flexibility Operator (flexibility provider) in this function.

In the network state red R, a safety device 21 transmits control commands with regard to electrical power or load (continuous arrow), which also pass via the central regulation unit 8 in accordance with the invention. Only control signals of the safety device 21 with a high priority (dashed arrow), the "priority signals" would be transmitted in the case of conventional flexibility providers, directly to the control system 19 or the control and adjustment units 18. The central regulation unit 8 operated in accordance with the invention is intended largely to prevent such a case of a direct access, for example, from the distribution network operator, in that the regulation unit 8 makes use of the method in accordance with the invention.

Figure 2:
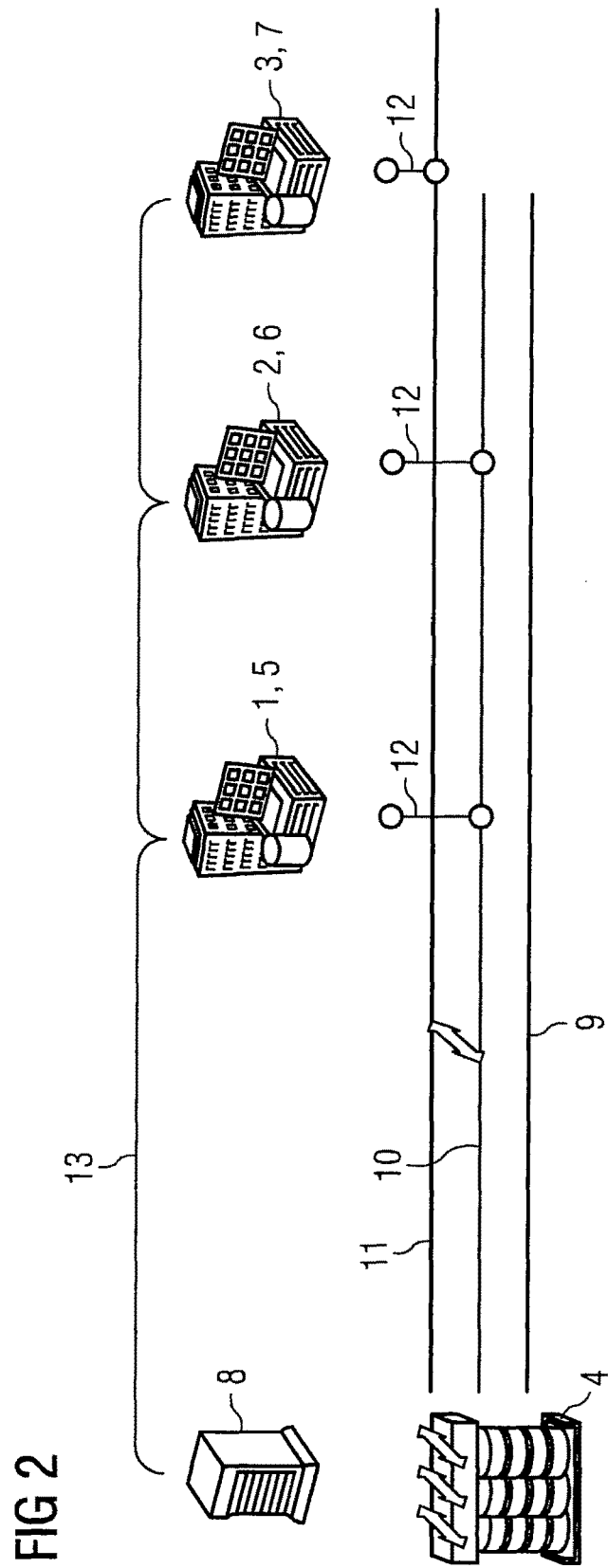
FIG. 2 is a schematic representation of a low voltage network in accordance with the invention.

FIG. 2 shows, by way of example, the scheme of a low voltage network that is supplied with electrical energy via a distribution transformer 4. The low voltage network has controllable components, such as smart buildings 1, 2, 3 (intelligent buildings—both accommodation and business premises), of which only three are represented, here. Naturally, other controllable and non-controllable components can also be present in the low voltage network, although these are not represented, here. In particular, other types of controllable components can also be incorporated into the method in accordance with the invention. All components of the low voltage network are connected via electrical transmission lines between one another and to the distribution transformer 4, specifically to the three phase conductors, the conductor strands 9, 10, 11. The smart buildings 1, 2, 3 are each connected via connecting lines 12 to the conductor strand 9, 10, 11. The first 1 and second smart building 2 are herein connected to the second conductor strand 10 and the third smart building 3 is connected to the third conductor strand 11.

The smart buildings 1, 2, 3 each have a building automation system 5, 6, 7 that coordinates in general the procurement, conversion, distribution and use of energy, in this case electrical energy. The coordination occurs predictively, in organized and systematic ways and taking account of ecological and economic targets. It comprises organization and information structures including the technical measures, for example, software necessary therefor. In accordance with the invention, a building automation system 5, 6, 7 therefore comprises at least one computer or an SPS with energy management software and data connections (e.g., data lines) to information sources, measuring devices and to the components of the building to be controlled.

The building automation systems 5, 6, 7 are connected via a communication network 13 to the central regulation unit 8. In one embodiment, the communication network 13 can consist of just the conductor strands 9, 10, 11 of the low voltage network, so that a power line communication (PLC) is realized. In this case, the building automation system 5, 6, 7 has a PLC modem. However, dedicated data connections can also be created for the method in accordance with the invention or other existing data connections (e.g., from smart meters) can be used. In the case of a smart meter, this is integrated into the building automation system 5, 6, 7 or is at least connected thereto.

The building automation system 5, 6, 7 therefore hears (or "listens") continuously via its PLC modem or its smart meter as to whether a priority signal containing an action instruction and a probability factor is transmitted.

If a network problem (e.g., very severe overvoltage over several minutes), represented in FIG. 2 with a thunderbolt, now occurs in the second conductor strand 10, then the central regulation unit 8 (if the distribution transformer 4 was unable to solve the network problem by tap changing) calculates the necessary priority signal in the form of an action instruction in accordance with the invention and transmits the priority signal to the building automation systems 5, 6, 7. The action instruction can be, for example, "reduce effective power xy kW", "increase effective power xy kW", "reactive power inductive xy kVAr" or "reactive power capacitive xy kVAr". Also conceivable are combinations of such action instructions. The probability factor that is also transmitted is a value between 0 and 1 and, given an insufficient reaction and thus no reduction in the threshold value overshoot, is incrementally increased.

In the first embodiment of the method, all the building automation systems 5, 6, 7 receive the same action instruction with the same probability factor. Only a different selection factor of the individual building automation systems 5, 6, 7 can cause the smart buildings 1, 2, 3 to contribute with different priority to the rectifying of the threshold value overshoot.

However, the smart building 3 can contribute nothing by complying with the action instruction, because it is not connected to the affected conductor strand 10. If the smart buildings 1, 2 do not have sufficient emergency reserves, the problem cannot be solved by the smart buildings 1, 2 and the central regulation unit 8 must notify this to the central site of the network operator. A disadvantage of the first embodiment of the method is that all the smart buildings 1, 2, 3 supply the maximum emergency reserve without solving the problem.

In the second embodiment of the method, in which the topology of the low voltage network is known in relation to the building automation systems 5, 6, 7, the individual building automation systems 5, 6, 7 receive different action instructions, but with the same probability factor. An action instruction to a building automation system could therefore be "reduce effective power xy kW", whilst the action instruction to another building automation system is "reduce effective power yz kW", possibly also depending on the topology.

For this purpose, the central regulation unit 8 can have a topology model and, based thereon, select individual smart buildings 1, 2, 3 or a group. This can occur, for example, via a contribution matrix in which the effectiveness of individual smart buildings 1, 2, 3 at particular network nodes is stored. In order that in this case a particular certainty factor or a particular fairness can also be implemented, the group is not reduced to the smallest possible (e.g., not to one smart building), but also a correspondingly larger number of participating controllable components.

Therefore, only the building automation systems 5, 6 receive an action instruction because the smart buildings 1, 2 are connected to the relevant conductor strand 10. The building automation system 7 receives no action instruction. In addition, a different selection factor of the individual building automation systems 5, 6 can cause the smart buildings 1, 2 to contribute with different priority to the rectifying of the threshold value overshoot.

In the two disclosed embodiments of the method, via a random generator, a value between 0 and 1 is determined by an algorithm within each building automation system 5, 6, 7 for each new priority signal that arrives. On an incremental increase in the probability factor, this has the effect that not all simultaneously or always the same ones must contribute first to solving the threshold value overshoot. This selection factor therefore serves to establish a certain degree of fairness.

Figure 3:
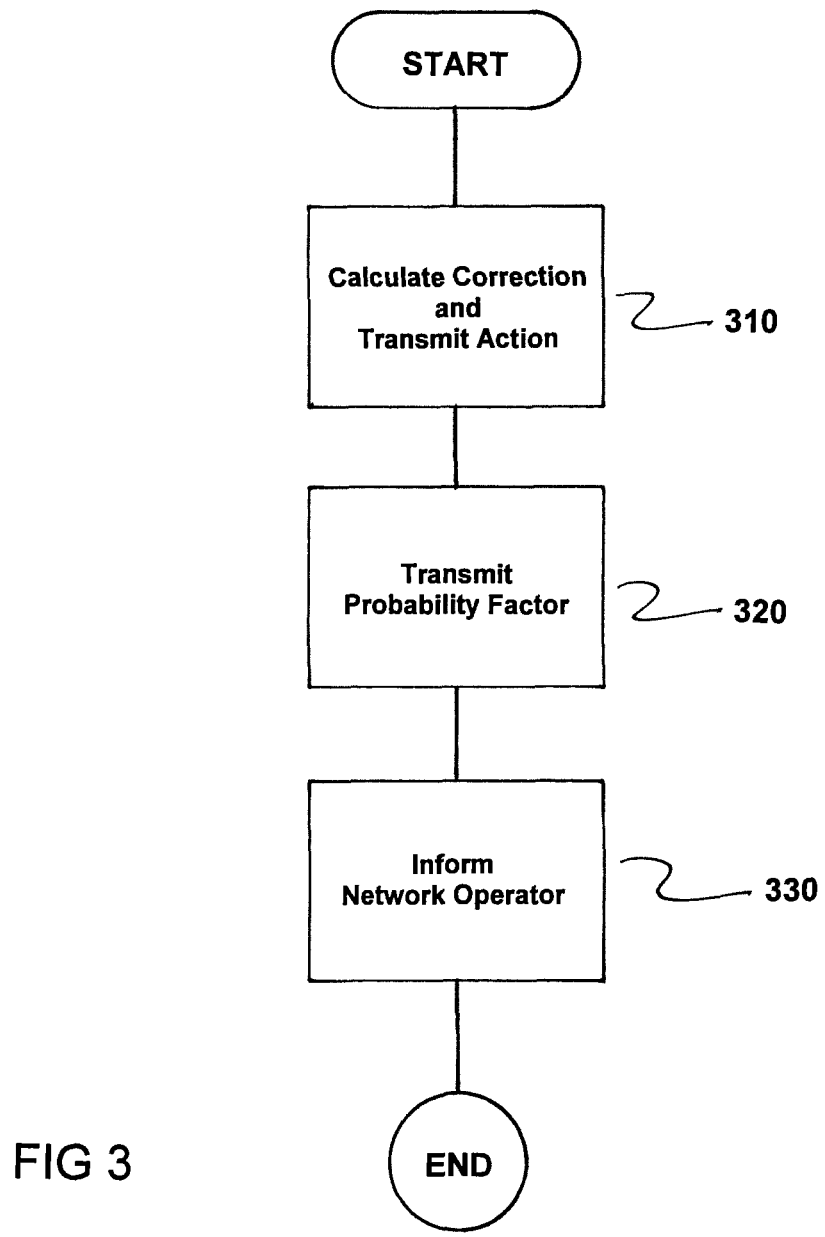
FIG. 3 is a flowchart of the method in accordance with the invention.

FIG. 3 is a flowchart of a method for network regulation upon threshold value overshoots in a low voltage or medium voltage network, wherein control commands are transmitted from a central regulation unit (8) of the low voltage or medium voltage network to controllable components (1, 2, 3) of the low voltage or medium voltage network. The method comprises calculating, by the central regulation unit (8), a necessary correction and transmitting a suitable action instruction for reducing threshold value overshoots to at least one controllable component (1, 2, 3) upon an occurrence of a threshold value overshoot, as indicated in step 310.

Next, a probability factor which is incrementally raised if, given an insufficient reaction of the controllable components (1, 2, 3), the threshold value overshoot is not prevented and thus an action instruction must be transmitted anew is transmitted with each action instruction, as indicated in step 320.

A network operator is now informed by the central regulation unit (8) if emergency reserves of the controllable components (1, 2, 3) are not sufficient to prevent the threshold value overshoot, as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for network regulation upon threshold value overshoots in a low voltage or medium voltage network, wherein control commands are transmitted from a central regulation unit of the low voltage or medium voltage network to controllable components of the low voltage or medium voltage network, the method comprising:
   calculating, by the central regulation unit, a necessary correction and transmitting a suitable action instruction for reducing threshold value overshoots to at least one controllable component upon an occurrence of a threshold value overshoot;
   transmitting, with each action instruction, a probability factor having a value in a range between 0 and 1, which is incrementally raised when, given an insufficient reaction of the controllable components, the threshold value overshoot is not prevented and thus an action instruction must be transmitted anew, and by which a requirement to take action for the at least one controllable component is compulsory upon reaching the value 1;

adding a specified selection factor having a value in a range between 0 and 1 for each controllable component in accordance with a random process to the probability factor, the selection factor remaining unchanged for a respective existing threshold value overshoot, and a requirement to take action for a respective controllable component being compulsory when the probability factor reaches the value 1;

operating the low voltage or medium voltage network and controlling the controllable components of the low voltage or medium voltage network; and informing, by the central regulation unit, a network operator when emergency reserves of the controllable components are not sufficient to prevent the threshold value overshoot.

2. The method as claimed in claim 1, wherein the same action instruction is transmitted with the same probability factor to a plurality of controllable components which are able to receive such action instructions.

3. The method as claimed in claim 2, wherein the same action instruction is transmitted with the same probability factor to all controllable components which are able to receive the action instructions.

4. The method as claimed in claim 1, wherein different action instructions are transmitted for different controllable components, but with the same probability factor.

5. The method as claimed in claim 4, wherein the selection of the controllable components is performed based on topological information about the low voltage or medium voltage network.

6. The method as claimed in claim 4, wherein a minimum number of controllable components is selected.

7. The method as claimed in claim 5, wherein a minimum number of controllable components is selected.

8. The method as claimed in claim 1, wherein each controllable component specifies for itself, according to a random process, a selection factor which is added to the probability factor and on each further threshold value overshoot in the low voltage or medium voltage network is specified anew.

9. The method as claimed in claim 1, wherein the action instruction contains one of the following control commands:
reduce the effective power by a specified amount,
increase the effective power by a specified amount,
set a specified inductive reactive power, or
set a specified capacitive reactive power.

10. A system comprising:
a central regulation unit; and
a plurality of controllable components of the low voltage or medium voltage networks which are connected to one another via a communication network;
wherein the plurality of controllable components have a receiving device for receiving action instructions via the communication network;
wherein the central regulation unit is configured to calculate, upon an occurrence of a threshold value overshoot, a necessary correction and configured to transmit a suitable action instruction for reducing threshold value overshoots to at least one controllable component;
wherein the central regulation unit is further configured in order, with each action instruction, to also transmit a probability factor having a value in a range between 0 and 1, which is incrementally raised when, given an insufficient reaction of the controllable components, the threshold value overshoot is not prevented and thus an action instruction must be transmitted anew, and by which a requirement to take action for the at least one controllable component is compulsory upon reaching the value 1;

wherein a specified selection factor having a value in a range between 0 and 1 for each controllable component in accordance with a random process is added to the probability factor, the selection factor remaining unchanged for a respective existing threshold value overshoot, and a requirement to take action for a respective controllable component being compulsory when the probability factor reaches the value 1;

wherein the system is operated to control the controllable components of the low voltage or medium voltage network and regulate the low voltage or medium voltage network upon threshold value overshoots in the low voltage or medium voltage network; and wherein the central regulation unit is further configured to inform a network operator when emergency reserves of the controllable components are not sufficient to prevent the threshold value overshoot.

11. The system as claimed in claim 10, wherein the controllable components are buildings with building automation systems wherein the receiving device is a component part of the respective building automation system.

12. The system as claimed in claim 11, wherein the communication network comprises a carrier frequency system.

13. The system as claimed in claim 11, wherein the communication network comprises remotely readable counters.

14. The system as claimed in claim 10, wherein the communication network comprises a carrier frequency system.

15. The system as claimed in claim 10, wherein the communication network comprises remotely readable counters.

16. A non-transitory computer program product encoded with a computer program which is loaded directly into a memory store of a central regulation unit of a low voltage or medium voltage network which, when executed by the central regulation unit, causes network regulation upon threshold value overshoots in a low voltage or medium voltage network; the computer program comprising:
program code for calculating, by the central regulation unit, a necessary correction and transmitting a suitable action instruction for reducing threshold value overshoots to at least one controllable component upon an occurrence of a threshold value overshoot;
program code for transmitting, with each action instruction, a probability factor having a value in a range between 0 and 1, which is incrementally raised when, given an insufficient reaction of the controllable components, the threshold value overshoot is not prevented and thus an action instruction must be transmitted anew, and by which a requirement to take action for the at least one controllable component is compulsory upon reaching the value 1;
program code for adding a specified selection factor having a value in a range between 0 and 1 for each controllable component in accordance with a random process to the probability factor, the selection factor remaining unchanged for a respective existing threshold value overshoot, and a requirement to take action for a respective controllable component being compulsory when the probability factor reaches the value 1; and program code for informing, by the central regulation unit, a network operator when emergency reserves of the controllable components are not sufficient to prevent the threshold value overshoot wherein the program code operates the low voltage or medium voltage network and controls the controllable components of the low voltage or medium voltage network.

* * * * *